United States Patent
Egger et al.

(10) Patent No.: US 8,370,029 B2
(45) Date of Patent: Feb. 5, 2013

(54) METHOD AND DEVICE FOR DETECTING A JAM

(75) Inventors: Andreas Egger, Vienna (AT); Roman Morawek, Vienna (AT); Peter Stephan Mulacz, Pottenbrunn (AT)

(73) Assignee: Continental Automotive GmbH, Hannover (DE)

( * ) Notice: Subject to any disclaimer, the term of this patent is extended or adjusted under 35 U.S.C. 154(b) by 551 days.

(21) Appl. No.: 12/666,874

(22) PCT Filed: Jun. 24, 2008

(86) PCT No.: PCT/EP2008/057995
§ 371 (c)(1),
(2), (4) Date: Dec. 28, 2009

(87) PCT Pub. No.: WO2009/000823
PCT Pub. Date: Dec. 31, 2008

(65) Prior Publication Data
US 2010/0179733 A1    Jul. 15, 2010

(30) Foreign Application Priority Data
Jun. 28, 2007   (DE) .................. 10-2007-029-823

(51) Int. Cl.
*G05D 3/00*   (2006.01)

(52) U.S. Cl. ........... 701/49; 318/266; 318/282; 318/286

(58) Field of Classification Search ........ 701/36, 701/49; 318/266, 280, 282, 286, 432, 433
See application file for complete search history.

(56) References Cited

U.S. PATENT DOCUMENTS

| | | | |
|---|---|---|---|
| 5,530,329 A | 6/1996 | Shigematsu et al. | 318/469 |
| 6,002,227 A * | 12/1999 | Lamm et al. | 318/468 |
| 6,070,116 A * | 5/2000 | Pruessel et al. | 701/49 |
| 6,219,599 B1 * | 4/2001 | Lamm et al. | 701/36 |
| 6,472,836 B1 * | 10/2002 | Uebelein et al. | 318/445 |
| 6,686,669 B1 * | 2/2004 | Knab et al. | 307/9.1 |
| 6,753,669 B2 * | 6/2004 | Spreng et al. | 318/469 |
| 7,170,244 B2 * | 1/2007 | Choby | 318/280 |

(Continued)

FOREIGN PATENT DOCUMENTS

| | | |
|---|---|---|
| DE | 19511581 | 10/1995 |
| DE | 19539925 | 5/1996 |

(Continued)

OTHER PUBLICATIONS

German Office Action for Application No. 10 2007 029 823.6 (3 pages).
International Search Report and Written Opinion for Application No. PCT/EP2008/057995 (12 pages).

Primary Examiner — Russell Frejd
(74) Attorney, Agent, or Firm — King & Spalding L.L.P.

(57) ABSTRACT

For the purpose of detecting a jam during the adjustment of a component of a motor vehicle using an adjustment drive, wherein measured values related to the adjustment force (F) are compared to a threshold value (FREF) and when the threshold value is reached, the adjusting movement is slowed or stopped, and optionally reversed, it is proposed that the component speed or a parameter correlated therewith is detected and the threshold value (FREF) modified accordingly.

12 Claims, 4 Drawing Sheets

U.S. PATENT DOCUMENTS

| | | | |
|---|---|---|---|
| 7,305,290 B2 | 12/2007 | Russ et al. | 701/36 |
| 7,388,339 B2 | 6/2008 | Held | 318/283 |
| 7,734,395 B2 * | 6/2010 | Urbahn et al. | 701/45 |
| 7,782,001 B2 * | 8/2010 | Herwig et al. | 318/470 |
| 7,898,195 B2 * | 3/2011 | Sone et al. | 318/280 |
| 8,022,653 B2 * | 9/2011 | Oxle et al. | 318/460 |
| 8,084,978 B2 * | 12/2011 | Buhlheller et al. | 318/466 |
| 8,089,230 B2 * | 1/2012 | Fuchs et al. | 318/286 |
| 2002/0189168 A1 * | 12/2002 | Sicuranza | 49/26 |
| 2003/0171866 A1 * | 9/2003 | Heinrich et al. | 701/49 |
| 2007/0182352 A1 | 8/2007 | Oxle et al. | 318/453 |
| 2007/0214722 A1 | 9/2007 | Oxle et al. | 49/31 |
| 2009/0171537 A1 * | 7/2009 | Kraus et al. | 701/49 |

FOREIGN PATENT DOCUMENTS

| | | |
|---|---|---|
| DE | 20316222 | 1/2005 |
| DE | 202004000266 | 2/2005 |
| DE | 102005000753 | 8/2005 |
| DE | 102004022807 | 12/2005 |
| DE | 102005016893 | 4/2006 |
| DE | 202005019464 | 5/2007 |

* cited by examiner

FIG 4

METHOD AND DEVICE FOR DETECTING A JAM

CROSS-REFERENCE TO RELATED APPLICATIONS

This application is a U.S. National Stage Application of International Application No. PCT/EP2008/057995 filed Jun. 24, 2008, which designates the United States of America, and claims priority to German Application No. 10 2007 029 823.6 filed Jun. 28, 2007, the contents of which are hereby incorporated by reference in their entirety.

TECHNICAL FIELD

The invention relates to a method of detecting a jam during the adjustment of a component of a motor vehicle with the aid of an adjustment drive, wherein measured values related to the adjustment force are compared with a threshold value, upon the attainment of which the adjusting movement is slowed or stopped, or optionally reversed.

BACKGROUND

The invention further relates to a device for detecting a jam during the adjustment of a component of a motor vehicle with the aid of an adjustment drive, comprising means of acquiring measured values related to the adjustment force, which are applied to a comparison unit in order to compare them with a threshold value and, if the threshold value is exceeded, to slow or stop, optionally reverse the adjusting movement.

In the case of the adjustment of components in motor vehicles, such as in particular electrically operated window lifts or sliding roofs, said adjustment being actuated by an external force, an anti-jam system is specified for limiting the excess force generated by the adjustment drive. Ideally, this anti-jam system immediately detects a jam in that during an adjusting operation it compares adjustment force values, which are actually determined in preset positions, with a preset threshold value. If the adjustment force summoned up by the motor rises above this threshold value, this indicates an obstacle in the adjustment path of the component and a "jam" is inferred; the movement of the component is then as a rule stopped, but optionally the motor may also be reversed.

The anti-jam system is effective during the adjusting operation at least within a sub-region of the adjustment path, for example when a sliding window approaches a preset distance from the closed position, wherein at least in this sub-region of the adjustment path in preset, rapidly succeeding positions actual force values or variables correlated therewith, such as values of the window pane velocity, are determined, and corresponding values are compared as "force values" with the threshold value.

If the threshold value is exceeded, then in the known systems as a result of time delays in the electric circuit, such as for example an operating delay of trigger relays, as well as generally as a result of the mechanical inertia of the adjustment system and also the mechanical play contained therein the adjusting movement is not stopped immediately but carries on for a short time, i.e. the jamming continues, before the adjusting movement is stopped and optionally a reversal of motion is initiated. This ongoing clamping leads, depending on the stiffness of the jammed object (for example the arm of a person), to an increase in the jamming force. This increase in the jamming force naturally depends upon how long the ongoing clamping lasts, and in particular also upon how fast the component, for example the window pane or the sliding roof, was being moved prior to the jam. Accordingly, if the jam detection is effected at a constant force, the resulting clamping force depends also upon the velocity of the adjustment of the component. This variation of the clamping force is naturally undesirable. Ideally, for an optimally tuned system it should be possible to assume constant clamping forces in order, on the one hand, to meet the prevailing safety regulations and, on the other hand, to ensure as large as possible a safety margin with regard to a potentially incorrect stopping or reversing of the movement of the motor vehicle component. However, each fluctuation of the clamping force, as mentioned i.e. also as a function of the velocity of adjustment of the component, reduces this safety margin.

In the past, the reduction of the safety margin was mostly accepted and no measures were taken to compensate the described phenomenon. By way of compensation it has however also already been proposed to adjust the threshold value by an amount that is linearly dependent upon the supply voltage. This change in the threshold value is based on the discovery that the change in the adjusting velocity of the respective motor vehicle component are caused primarily by different vehicle electrical system voltages in the motor vehicle. However, even with this procedure only an unsatisfactory compensation of the clamping force fluctuations is possible since the variation of the adjusting velocity is caused only partly by fluctuations in the vehicle electrical system voltage, i.e. the supply voltage. Other influencing variables on different adjusting velocities are present for example as a result of fluctuations in the sluggishness of the mechanical system that are caused in particular also by temperature fluctuations. Such influencing variables lead to velocity changes to a similarly large extent as the fluctuations of the supply voltage.

SUMMARY

According to various embodiments, this can be remedied and a method and/or a device of the type described in the introduction can be provided, which enables an adequate adaptation of the threshold value with a view to the reliable detection of constant clamping forces and hence a large safety margin with regard to potentially incorrect stopping or incorrect reversing.

According to an embodiment, in a method for detecting a jam during the adjustment of a component of a motor vehicle with the aid of an adjustment drive, wherein measured values related to the adjustment force are compared with a threshold value, upon the attainment of which the adjusting movement is slowed or stopped, or optionally reversed, the velocity of the component or a variable correlated therewith is acquired and the threshold value is modified as a function thereof.

According to a further embodiment, the threshold value can be increased for lower velocities and/or reduced for higher velocities. According to a further embodiment, the increase or reduction of the threshold value may bear a generally linear relationship to a drop or increase in the velocity. According to a further embodiment, the velocity can be subjected to low-pass filtering for the modification of the threshold value. According to a further embodiment, the velocity can be subjected to asymmetrical filtering, wherein in the event of a rise of the velocity a weak filtering and in the event of a drop of the velocity a strong filtering is carried out. According to a further embodiment, a filtering of the velocity may be carried out only in the event of a drop in the velocity. According to a further embodiment, as a variable correlated with the component velocity the angular velocity of a motor provided as an adjustment drive may form the basis.

According to another embodiment, a device for detecting a jam during the adjustment of a component of a motor vehicle with the aid of an adjustment drive, may comprise means of acquiring measured values related to the adjustment force, which are applied to a comparison unit in order to compare them with a threshold value and, if the threshold value is exceeded, to slow or stop, or optionally reverse the adjusting movement, characterized by means of acquiring the velocity of the component and/or a variable correlated therewith and by a threshold value modification module connected thereto for adapting the threshold value to a changing velocity.

According to a further embodiment, the threshold value modification module can be devised to increase the threshold value for lower velocities and/or reduce it for higher velocities. According to a further embodiment, the means of acquiring the velocity and/or the variable correlated therewith may comprise a low-pass filter module for filtering the velocity for the modification of the threshold value. According to a further embodiment, the low-pass filter module can be devised for an asymmetrical filtering, wherein in the event of an increase in the velocity a weak filtering and in the event of a drop of the velocity a strong filtering is carried out. According to a further embodiment, the low-pass filter module can be devised to carry out filtering only in the event of a drop in the velocity.

BRIEF DESCRIPTION OF THE DRAWINGS

The invention is described in more detail below by way of embodiments, to which however the invention is not to be restricted, and with reference to the drawings. The drawings show in particular.

DETAILED DESCRIPTION

According to various embodiments, it is therefore provided that the component velocity and/or a variable correlated therewith, in particular the angular velocity of an electric motor that is used for example as an adjustment drive for the adjustment of the respective motor vehicle component, is acquired, and that the threshold value for determining the occurrence of a jam is then modified as a function of this variable and/or velocity.

It is therefore provided that the kinetic energy contained in the system has some influence in a readjustment of the clamping force threshold value. The threshold value therefore experiences an "offset" (optionally a further "offset", should a readjustment have already been provided—as is known—on account of fluctuations in the supply voltage), wherein this modification then bears a relationship to the component velocity. In the simplest case, this relationship may be linear, wherein for lower component velocities the threshold value is increased and/or for higher component velocities the threshold value is reduced. The changes are in this case naturally also dependent upon the drive system itself, wherein a corresponding system factor that is easy to determine empirically is to be taken into account for the magnitude of the change in the threshold value.

When for the sake of simplicity reference is made below to the (component) velocity, this is to be interpreted in such a way that the variable correlated therewith, for example the velocity of the adjustment drive, in particular the angular velocity of an electric motor, is also included.

It is further to be emphasized that by the threshold value is meant a value that is composed of a reference force and a tripping threshold.

Such an, as such, very simple and hence advantageous design would not however take account of the circumstance that, in the event of a jam that causes a braking of the adjusting movement, the resulting reduction of the velocity of the motor would lead to an increase in the threshold value. As a result, the clamping force would possibly be unacceptably increased. To prevent this, according to an embodiment, it can be provides that the relationship be established with a filtered velocity, instead of with merely the component velocity, for example the angular velocity of the motor. In this case, transient fluctuations in the velocity may be filtered out as low-pass filtering is to be used to filter the velocity. The low pass in this case is to be so designed that in the event of a transient jam no significant drop in the velocity is to be determined. However in any case the general velocity characteristic is to be followed at all times.

What is problematic here is for example the phase of start-up of the adjustment drive, for example the electric motor, which occurs relatively quickly. However, it takes a relatively long time for the filtered velocity to reach a steady-state value. In order, here too, to ensure a constancy of the clamping forces, an asymmetrical filter concept can be preferentially provided, wherein the velocity is subjected to asymmetrical filtering: upon an increase in the velocity and upon a lowering of the velocity a weak filtering and a strong filtering is carried out respectively. Thus, in the event of an increase in the velocity, as during the start-up of an electric motor, filtering of a type that makes it possible to respond relatively quickly to—positive—velocity changes with a change in the threshold value is carried out. A reduction in the velocity, as in the event of a jam, is however taken into account by the use of strong filtering so that, here, an unwanted increase in the threshold value may be avoided.

In the simplest case, with asymmetrical filtering it may be provided that a filtering of the velocity is carried out in principle only in the event of a reduction in the velocity. In the event of an increase in the velocity, it is possible to dispense with the low-pass filtering and the value of the velocity is taken into account directly in the adaptation of the threshold value.

With regard to the device, according to various further embodiments, it can therefore be preferably provided that the threshold value modification module is devised to increase the threshold value for lower velocities and/or to reduce the threshold value for higher velocities. It may further be preferred that the means of acquiring the velocity comprises a low-pass filter module for filtering the velocity for the modification of the threshold value. In the present case, the low-pass filter module can be preferably devised for asymmetrical filtering, wherein in the event of an increase in the velocity a weak filtering and in the event of a lowering of the velocity a strong filtering is carried out. On the other hand, the low-pass filter module may be devised to carry out filtering only in the event of a lowering of the velocity.

Figure 1:
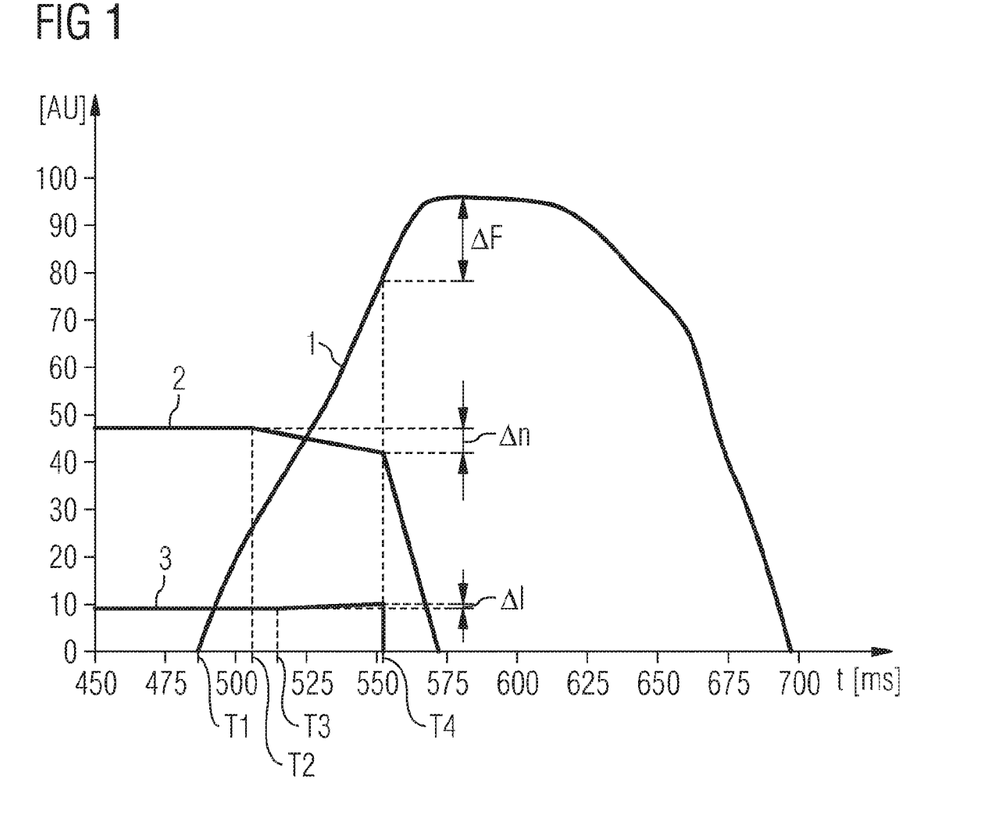
FIG. 1 a diagrammatic representation of the characteristic of the clamping force in the event of an article becoming jammed by a component of a motor vehicle that is being driven by an electric motor.

In the diagram according to FIG. 1 a curve 1 represents the (measured) clamping force at a jammed article, wherein the jam is assumed to start at a time T1. A curve 2 further shows, as a measure of the component velocity, the motor velocity, wherein it is evident that the motor velocity from a time T2, which is after the time T1, starts to drop before finally at a time T4, when the jam is detected, falling more or less rapidly to 0 (because the electric motor is stopped). A curve 3 finally represents the motor current, wherein this motor current at a time T3, which is after the time T2 when the reduction of the motor velocity begins, because of the jam starts to rise until finally upon detection of the jam at the time T4, with stopping of the motor, the motor current according to curve 3 suddenly falls to 0. Further shown in FIG. 1 are also the relative changes in the current—ΔI—as well as the change in the motor velocity—Δn—, wherein for example ΔI may be +13% and Δn −11%. After the time T4, as explained in the introduction, operating delays, the mechanical inertia of the system and the mechanical play lead additionally to an exceeding of the clamping force, cf. the differential value ΔF in FIG. 1, which may be for example ca. 18 N.

According to the present method it is now provided that the component velocity and/or, as a variable correlated therewith, the velocity of the adjustment drive, in particular the angular velocity ω of an electric motor, be incorporated as an influencing variable in the adaptation of the threshold value. The threshold value receives for this purpose an offset, i.e. a step-by-step offset or change by a preset amount per preset change in the velocity, wherein this change is as a whole dependent upon the velocity, for example the angular velocity ω correlated therewith. This relationship between the modification of the threshold value and the velocity ω may in a particularly simple case be linear, wherein in the event of a lower velocity the threshold value is stepped up. Conversely, the higher the component velocity becomes, the lower the threshold value is defined. The objective in this case is that for all the different velocities the respective threshold values are defined in such a way that the clamping forces are always practically constant. Without such a measure, as has been explained, the clamping forces would vary as a function of the different velocities.

On the y-axis of FIG. 1, moreover, the individual parameters are plotted in arbitrary units AU, whereas on the x-axis the time is plotted in ms. This similarly applies to FIG. 2.

Figure 2:
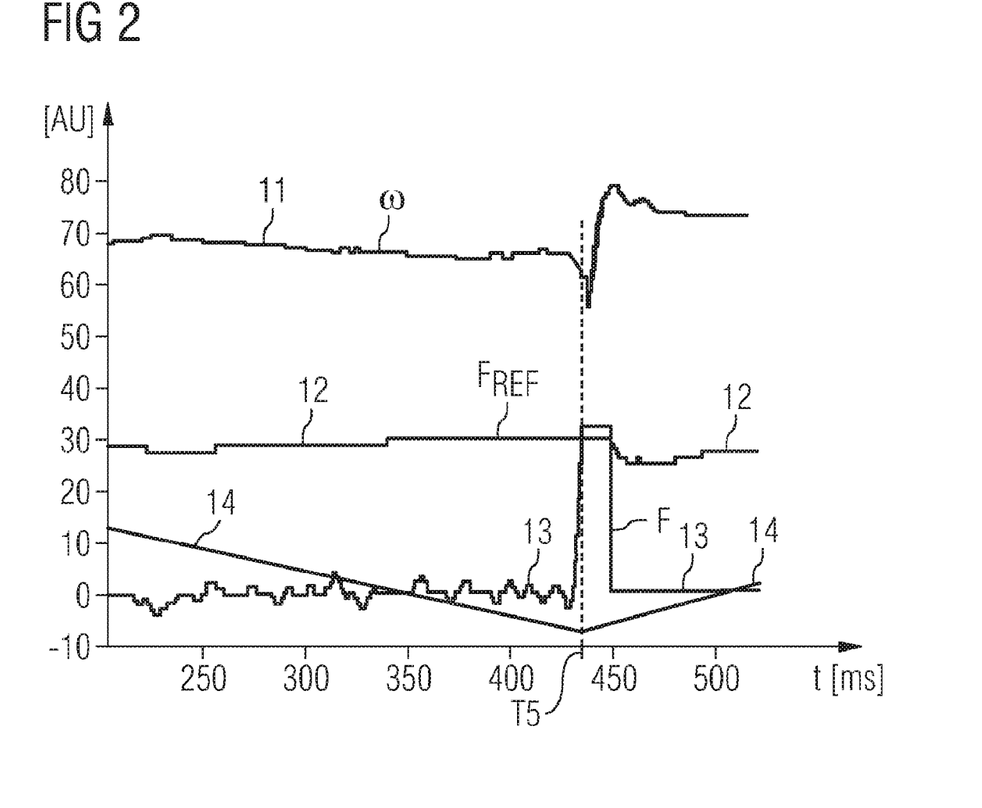
FIG. 2 in a diagram the time characteristic of the motor angular velocity and of the correspondingly adapted threshold value, wherein the characteristic of the motor position as well as the characteristic of an external force, corresponding to the clamping force, are likewise represented.

In this diagram of FIG. 2 the motor angular velocity ω as a variable correlated with the component velocity is represented by way of example by a curve 11, and the characteristic of the modified threshold value $F_{REF}$ for the clamping force is further shown by a curve 12. The curve 13 then represents an external force, i.e. the calculated clamping force, and the curve 14 denotes the motor position, wherein it is evident that at a time T5 a reversal of the motor occurs, owing to the detection of a jamming of an article during the closing of a motor vehicle component that is not represented in detail, such as for example a window pane or a sliding roof of a motor vehicle.

From the curves 11 and 12 in FIG. 2 it is evident that upon an increase in the motor angular velocity ω, curve 11, a lowering of the threshold value $F_{REF}$, curve 12, occurs, but upon a reduction in the angular velocity ω the threshold value $F_{REF}$ is successively increased. In the region of the jam detection, where the angular velocity ω slows, the threshold value $F_{REF}$ is however kept constant.

This behavior is obtained by means of a suitable low-pass filtering of the angular velocity ω (or generally of the component velocity), so that rapid changes in the angular velocity ω do not lead to a change in the threshold value $F_{REF}$. Above all, however, the effect achieved by the change in the threshold value $F_{REF}$ for the jam detection as a function of the angular velocity ω of the electric motor is that matching clamping forces in the system are taken into account, independently of the adjusting velocity of the component. The effect achieved by the low-pass filtering is that the braking of the system that occurs in the event of a jam does not lead to an increase of the threshold value, see FIG. 2, curve 12, in the region before and after the time T5.

In the case of the low-pass filtering, the procedure is to be such that a jam does not lead to any significant drop in the angular velocity value that is to be taken into account, wherein however the general velocity characteristic is to be followed. During a start-up of the electric motor, even though this start-up may occur relatively quickly, it may take a relatively long time for the filtered angular velocity to reach a steady-state value. For this reason, for the filtering of the angular velocity an asymmetrical filter concept is provided, wherein for an increase in the angular velocity, as during the start-up of the motor, a weak filtering is carried out, while for a reduction of the angular velocity, as in the case of a jam, a strong filtering is effected.

In the simplest case, in the event of an increase in the angular velocity it is possible to dispense with the filtering entirely, and a filtering is provided only in the event of a reduction in the angular velocity. This procedure is represented diagrammatically in a flowchart in FIG. 3.

Figure 3:
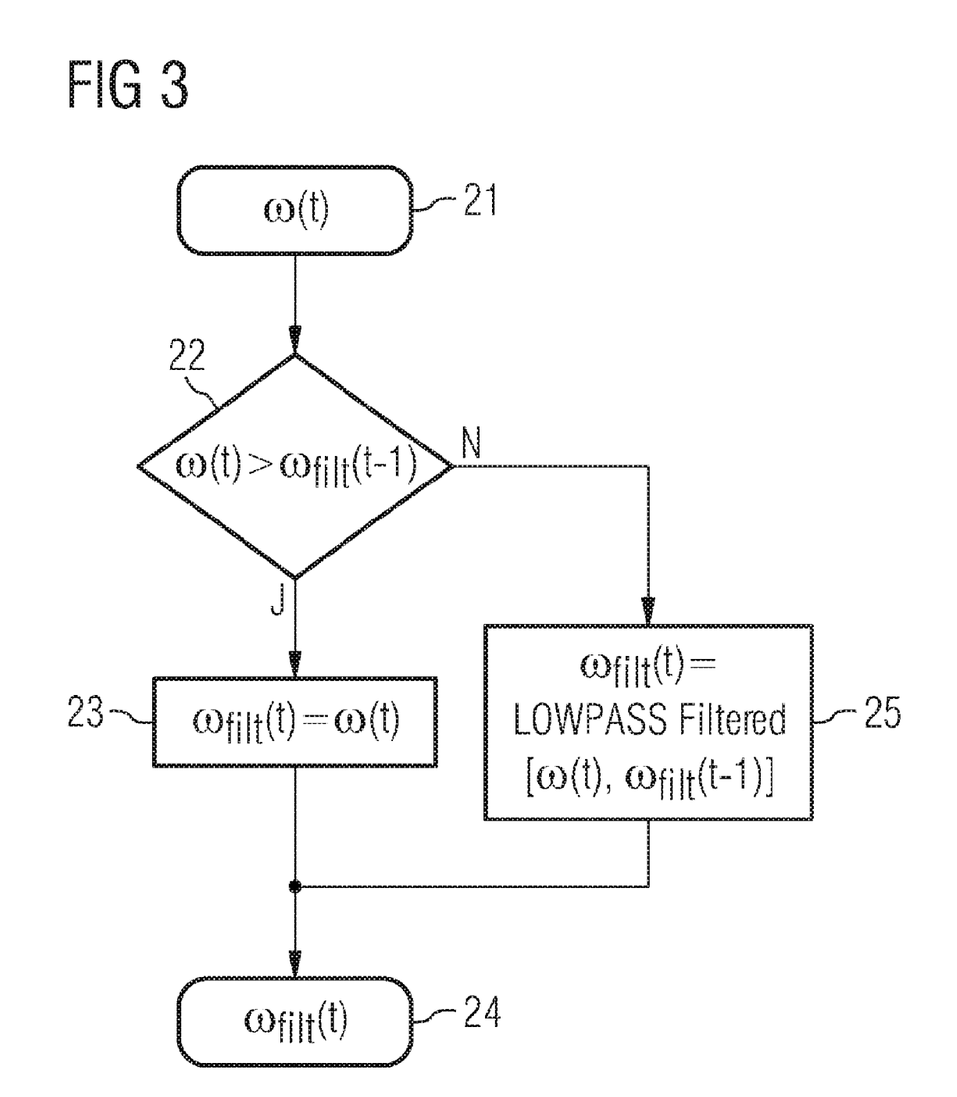
FIG. 3 a flowchart for carrying out an asymmetrical low-pass filtering operation for taking account of an optionally filtered motor angular velocity in the adaptation of the threshold value.

According to FIG. 3 after a start step 21, during which a fresh calculation cycle is begun and a fresh motor angular velocity ω(t) is acquired, in a checking step 22 it is checked whether the fresh angular velocity ω(t) is greater than the filtered angular velocity $ω_{filt}(t-1)$ obtained at the previous acquisition instant (t−1). If this is so, according to a block 23 in FIG. 3 the filtered angular velocity $ω_{filt}(t)=ω(t)$ is set, and according to an end block 24 the "filtered" angular velocity $ω_{filt}(t)$ that is to form the basis for a the modification of the threshold value is therefore present.

If however it emerges in the checking step 22 that ω(t) is not greater than ω(t−1), then according to a block 25 an actual low-pass filtering of ω(t) is carried out with reference to the previously obtained filtered angular velocity ω(t−1), so that then, for this situation too, the fresh (here actually) filtered angular velocity $ω_{filt}(t)$ is obtained, see also box 24 in FIG. 3.

Figure 4:
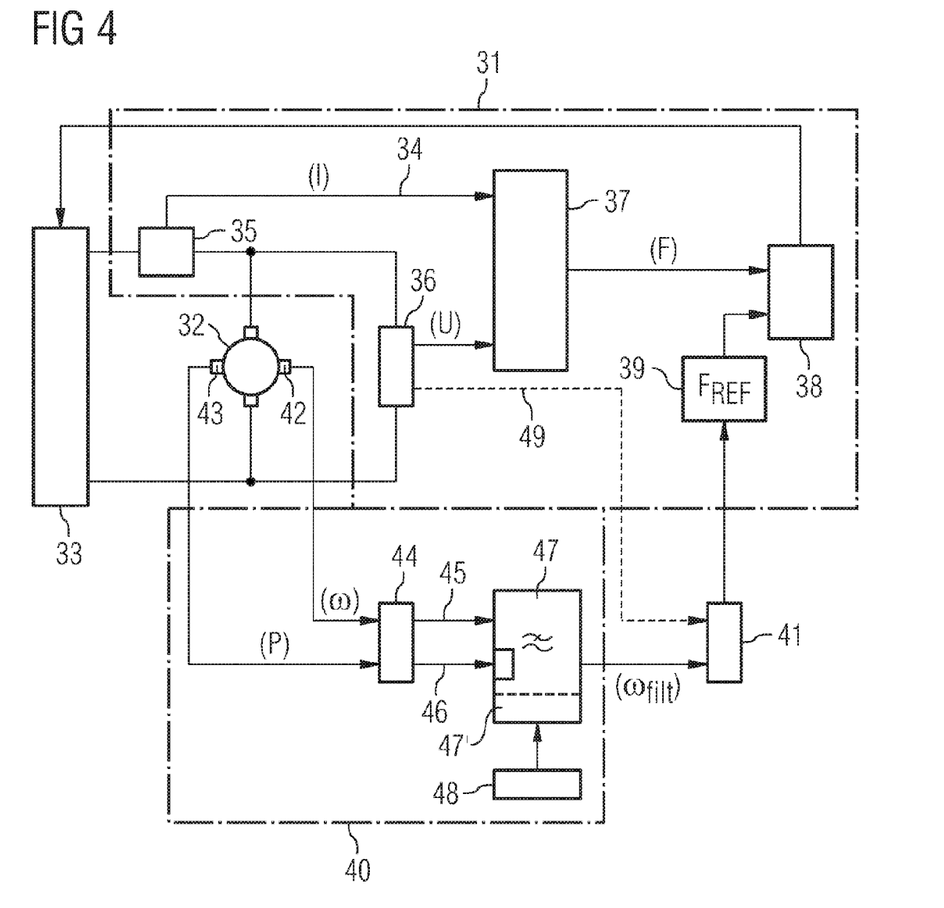
FIG. 4 in a block diagram a device for detecting a jam with simultaneous adaptation of the threshold value provided for this purpose.

FIG. 4 shows in a block diagram generally as an example a device 31 for limiting the closing force of a component, for example a window and/or window lift (not represented in detail), of a motor vehicle with the aid of an electric motor 32 provided as an adjustment drive, the device being described in short as CFL device 31 (CFL=closing force limitation). Associated with the motor 32 are power supply- and control means 33. Further provided are means 34 of acquiring measured values related to the adjustment force, wherein for example a current measuring circuit 35 and a voltage measuring circuit 36 are provided, which are connected by their outputs to a force determination unit 37 in order to calculate the external force F and/or a value related thereto. This force determination is effected in an, as such, conventional manner and, if in this case as a basis the acquisition of motor current I and motor voltage U is shown, this is to be interpreted as merely by way of example, and other possible ways of determining the force are also known and conceivable, such as for example on the basis of the motor velocity; cf. for example also FR 2 663 798 A or the earlier German application 10 2006 059 145.3.

A force value signal F is applied to an input of a comparison unit 38, which at its other input receives a preset threshold value $F_{REF}$ supplied by a selection unit 39. If the threshold value $F_{REF}$ is exceeded, the comparison unit 38 outputs a corresponding signal to the control means 33 in order to slow down and/or stop or even reverse the direction of rotation of the electric motor 32.

As explained, the threshold value $F_{REF}$ in the present case is variable in conjunction with changes in the angular velocity ω of the electric motor 32 (or variables related thereto), and for this purpose means 40 of acquiring the angular velocity ω of the electric motor 32 (and/or a measured variable correlated therewith) as well as a threshold value modification module 41 connected thereto for adapting the threshold value $F_{REF}$ are provided.

For acquiring the angular velocity ω of the electric motor 32, especially in conjunction with the acquisition of the position of the electric motor 32, in FIG. 4 merely quite diagrammatically represented, as such conventional sensors 42, 43, for example Hall-type sensors, are provided, the output signals of which are applied to a signal conditioning unit 44 in order to apply, on the one hand, a signal related to the angular velocity ω—cf. line 45—and, on the other hand, a signal related to the direction of changes of the angular velocity ω (rising or falling), cf. line 46 in FIG. 4, to a low-pass filter module 47.

This low-pass filter module 47 is devised for an asymmetrical low-pass filtering of the angular velocity signal ω, wherein in the event of a rising angular velocity ω a weak filtering and in the event of a falling angular velocity ω a strong filtering is effected. For selection of the necessary filter time constants, an input unit 48 for example is provided. It is also conceivable in this case, in the event of a rise in the angular velocity ω, for example during the start-up of the electric motor 32, to carry out no filtering at all and rather to carry out filtering of the angular velocity ω only in the event of a lowering of the angular velocity ω; cf. also the sequence according to FIG. 3.

As a function of the output signal ω of the low-pass filter module 47 the threshold value modification module 41 then controls the threshold value selection unit 39 accordingly in order to offset the basically preset threshold value $F_{REF}$ in an upward or downward direction, i.e. increase or reduce it, depending on the angular velocity ω.

The various components of the circuit according to FIG. 4 may be realized as such in the form of discrete elements; naturally, it is however also possible and as a rule preferable to realize at least some of these components or modules in the form of microprocessor software modules; this relates in particular to the low-pass filtering of the (angular) velocity signal as well as to the adjustment and selection of the threshold value $F_{REF}$. In particular, in this case it is also conceivable to provide a common microprocessor or microcomputer for these various functions, wherein moreover the selection of the filter time constant may also be effected as a one-off, so that in the practical realization of the circuit the input unit 48 may be omitted and the filter time constants are stored in a memory area 47' of the low-pass filter module 47.

It is moreover also conceivable, albeit not represented in the drawings, to provide a resetting of the threshold value $F_{REF}$ as a function of changes in the supply voltage of the adjustment drive, for example of the electric motor 32, as is as such already known, wherein this possibility is represented by dashed line 49 as a connection between the voltage measuring circuit 36 and the threshold value modification unit 41.

What is claimed is:

1. A method for detecting a jam during the adjustment of a component of a motor vehicle with the aid of an adjustment drive, the method comprising the step of:

comparing measured values related to the adjustment force with a threshold value, upon the attainment of which the adjusting movement is slowed or stopped, or reversed, wherein the velocity of the component or a variable correlated therewith is acquired and the threshold value is modified as a function thereof, wherein the velocity is subjected to asymmetrical low-pass filtering for the modification the threshold value, wherein in the event of a rise of the velocity a weak filtering is carried out and in the event of a drop a the velocity a strong filtering is carried out by selecting associated filter time constants.

2. The method according to claim 1, wherein the threshold value is at least one of increased for lower velocities and reduced for higher velocities.

3. The method according to claim 2, wherein the increase or reduction of the threshold value bears a generally linear relationship to a drop or increase in the velocity.

4. The method according to claim 1, wherein a filtering of the velocity is carried out only in the event of a drop in the velocity.

5. The method according to claim 1, wherein as a variable correlated with the component velocity the angular velocity of a motor provided as an adjustment drive forms the basis.

6. A device for detecting a jam during the adjustment of a component of a motor vehicle with the aid of an adjustment drive, comprising first means for acquiring measured values related to the adjustment force, which are applied to a comparison unit in order to compare them with a threshold value and, if the threshold value is exceeded, to slow or stop, optionally reverse the adjusting movement, second means for acquiring at least one of the velocity of the component and a variable correlated therewith, and a threshold value modification module, connected to the second means, for adapting the threshold value to a changing velocity, wherein the threshold value modification module is operable to subject the velocity to asymmetrical low-pass filtering for the modification of the threshold value, wherein in the event of a rise of the velocity a weak filtering is carried out and in the event of a drop of the velocity a strong filtering is carried out by selecting associated filter time constants.

7. The device according to claim 6, wherein the threshold value modification module is operable to at least one of increase the threshold value for lower velocities and reduce it for higher velocities.

8. The device according to claim 7, wherein the low-pass filter module is operable to carry out filtering only in the event of a drop in the velocity.

9. A method for detecting a jam during the adjustment of a component of a motor vehicle with the aid of an adjustment drive, the method comprising the steps of:

acquiring a velocity of the component or a variable correlated therewith and modifying a threshold value accordingly;

measuring values related to an adjustment force;

comparing the measured values with the threshold value;

upon attainment of the threshold, the adjusting movement is at least one of slowed, stopped, or reversed, wherein the velocity is subjected to asymmetrical low-pass filtering for the modification of the threshold value, wherein in the event of a rise of the velocity no filtering and in the event of a drop of the velocity filtering is carried out.

10. The method according to claim 9, wherein the threshold value is at least one of increased for lower velocities and reduced for higher velocities.

11. The method according to claim 10, wherein the increase or reduction of the threshold value bears a generally linear relationship to a drop or increase in the velocity.

12. The method according to claim 9, wherein as a variable correlated with the component velocity the angular velocity of a motor provided as an adjustment drive forms the basis.

* * * * *